(12) United States Patent
Ebihara

(10) Patent No.: US 11,445,015 B2
(45) Date of Patent: Sep. 13, 2022

(54) INFORMATION PROCESSING APPARATUS AND METHOD FOR PROCESSING INFORMATION

(71) Applicant: SONY CORPORATION, Tokyo (JP)

(72) Inventor: Munetake Ebihara, Tokyo (JP)

(73) Assignee: SONY CORPORATION, Tokyo (JP)

(*) Notice: Subject to any disclaimer, the term of this patent is extended or adjusted under 35 U.S.C. 154(b) by 198 days.

(21) Appl. No.: 16/603,324

(22) PCT Filed: Mar. 30, 2018

(86) PCT No.: PCT/JP2018/013745
§ 371 (c)(1),
(2) Date: Oct. 7, 2019

(87) PCT Pub. No.: WO2018/211834
PCT Pub. Date: Nov. 22, 2018

(65) Prior Publication Data
US 2021/0297484 A1  Sep. 23, 2021

(30) Foreign Application Priority Data

May 16, 2017  (JP) .............................. JP2017-097677

(51) Int. Cl.
| H04L 67/1074 | (2022.01) |
| H04L 9/32 | (2006.01) |
| H04L 67/1061 | (2022.01) |
| H04L 9/00 | (2022.01) |

(52) U.S. Cl.
CPC ........ H04L 67/1076 (2013.01); H04L 9/3236 (2013.01); H04L 67/1065 (2013.01); H04L 67/1078 (2013.01); H04L 9/50 (2022.05)

(58) Field of Classification Search
CPC ............. H04L 67/1076; H04L 67/1065; H04L 67/1078; H04L 9/3236; H04L 2209/38
See application file for complete search history.

(56) References Cited

U.S. PATENT DOCUMENTS

| 2009/0024854 | A1 | 1/2009 | Fukasawa | |
| 2017/0017954 | A1* | 1/2017 | McDonough | H04L 9/3239 |
| 2017/0330179 | A1* | 11/2017 | Song | G06Q 20/065 |
| 2017/0359374 | A1* | 12/2017 | Smith | H04L 9/3236 |
| 2018/0183600 | A1* | 6/2018 | Davis | G06F 16/951 |
| 2019/0386834 | A1* | 12/2019 | Furukawa | G06F 21/64 |

FOREIGN PATENT DOCUMENTS

| CN | 101349964 A | 1/2009 |
| JP | 2003-280972 A | 10/2003 |
| JP | 2006-301940 A | 11/2006 |
| JP | 2009-026014 A | 2/2009 |
| JP | 5858507 B1 | 2/2016 |
| JP | 2016-208347 A | 12/2016 |

OTHER PUBLICATIONS

International Search Report and Written Opinion of PCT Application No. PCT/JP2018/013745, dated Jun. 26, 2018, 10 pages of ISRWO.

* cited by examiner

*Primary Examiner* — Azizul Choudhury
(74) *Attorney, Agent, or Firm* — Chip Law Group

(57) ABSTRACT

It is desired to make it possible to verify data more properly while effectively utilizing resources. There is provided an information processing apparatus including a verification unit that verifies predetermined data using first data obtained from the predetermined data and second data obtained from a P2P database.

5 Claims, 8 Drawing Sheets

FIG. 4

| ITEM | DATA EXAMPLE |
|---|---|
| FileID | [7fee20···0a]<br>※ HASH VALUE OF WHOLE FILE |
| FilePartNum | [3/23]<br>※ INDICATING THIRD DATA COLUMN AMONG 23 DIVISIONS |
| FileData | [2115/37]<br>※ INDICATING BIT STRING INCLUDED IN BIT LENGTH OF 37 BYTES STARTING FROM 2,115TH BYTE |

FIG. 5

| | ITEM | DATA EXAMPLE |
|---|---|---|
| INPUT | TRANSACTION HISTORY NUMBER | [0000123]<br>※ INFORMATION CAPABLE OF IDENTIFYING TRANSACTION HISTORY |
| | ELECTRONIC SIGNATURE | [304502····21]<br>※ ELECTRONIC SIGNATURE GENERATED BY SECRET KEY OF POOL |
| | PUBLIC KEY OF POOL | [04dc47····f1] |
| | AMOUNT OF REWARD | 25<br>※ AMOUNT OF VIRTUAL CURRENCY |
| OUTPUT | HASH VALUE OF PUBLIC KEY OF DEPOSIT DESTINATION NODE | [185a83····c3] |

INFORMATION PROCESSING APPARATUS AND METHOD FOR PROCESSING INFORMATION

CROSS REFERENCE TO RELATED APPLICATIONS

This application is a U.S. National Phase of International Patent Application No. PCT/JP2018/013745 filed on Mar. 30, 2018, which claims priority benefit of Japanese Patent Application No. JP 2017-097677 filed in the Japan Patent Office on May 16, 2017. Each of the above-referenced applications is hereby incorporated herein by reference in its entirety.

TECHNICAL FIELD

The present disclosure relates to an information processing apparatus and a method for processing information.

BACKGROUND ART

In general, in a case where a user (hereinafter referred to as a "depositor" for convenience) deposits some important data to another person (hereinafter referred to as a "custodian" for convenience), the user deposits the data to a reliable person. In a case where the depositor deposits data to an unreliable person, the depositor is required to verify that the custodian retains the data properly (e.g., the custodian has not tampered with the data, has not erased the data, etc.).

Furthermore, in recent years, there have been actively developed services, techniques, and the like for storing data, such as storage services, as related techniques. For example, Patent Document 1 set out below discloses a technique of generating assurance data for proving that, for example, the data deposited in a storage server is not tampered, and of associating the assurance data with the deposited data.

CITATION LIST

Patent Document

Patent Document 1: Japanese Patent Application Laid-Open No. 2003-280972

SUMMARY OF THE INVENTION

Problems to be Solved by the Invention

However, according to the technique disclosed in Patent Document 1, there has been a case where the deposited data may not be verified properly. For example, since an insider (administrator of the storage server, etc.) can erase or tamper with the assurance data itself, in a case where the insider has erased or tampered with the deposited data, it has been necessary to read out the entire deposited data again to complete existence confirmation and verification of the data deposited by the depositor.

Meanwhile, in a system (Bitcoin, etc.) using a blockchain that is an example of a peer-to-peer database, a lot of resources are consumed for an anonymous transaction process. For example, in Bitcoin, a plurality of nodes participating in what is called "mining" is to continue a process of calculating a hash value until the mining is successful, whereby it cannot be said that the resources of each node are effectively utilized.

The present disclosure has been conceived in view of the problems described above, and an object of the present disclosure is to provide a novel and improved information processing apparatus and a method for processing information capable of verifying data more properly while effectively utilizing resources.

Solutions to Problems

According to the present disclosure, there is provided an information processing apparatus including a verification unit that verifies predetermined data using first data obtained from the predetermined data and second data obtained from a P2P database.

Furthermore, according to the present disclosure, there is provided a method for processing information, the method including verifying predetermined data using first data obtained from the predetermined data and second data obtained from a P2P database.

Furthermore, according to the present disclosure, there is provided an information processing apparatus including a verification request unit that requests a P2P network to verify predetermined data, and a confirmation unit that confirms a verification status of the predetermined data on the basis of information obtained from the P2P network.

Furthermore, according to the present disclosure, there is provided a method for processing information, the method including requesting a P2P network to verify predetermined data, and confirming a verification status of the predetermined data on the basis of information obtained from the P2P network.

Effects of the Invention

As described above, according to the present disclosure, it becomes possible to verify data more properly while effectively utilizing resources.

Note that the effect described above is not necessarily limited, and any of the effects described in the present specification or another effect that can be understood from the present specification may be exerted in addition to the effect described above or instead of the effect described above.

BRIEF DESCRIPTION OF DRAWINGS

FIG. 4 is a table illustrating exemplary information included in a "file verification history" according to the present embodiment.

FIG. 5 is a table illustrating exemplary information included in a "virtual currency transaction history" according to the present embodiment.

MODE FOR CARRYING OUT THE INVENTION

Figure 1:
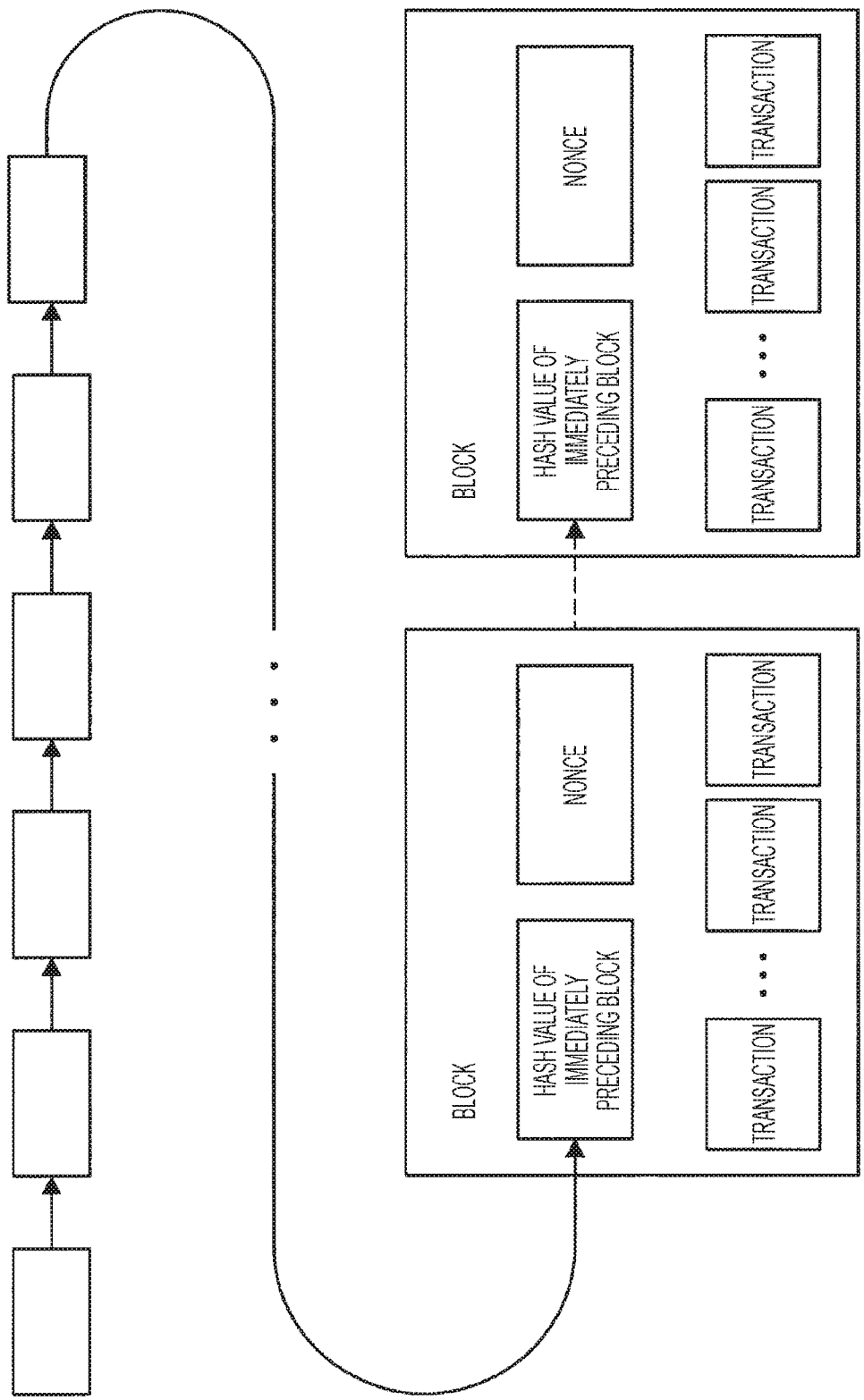
FIG. 1 is an explanatory diagram illustrating an outline of general blockchain data.

Hereinafter, a preferred embodiment of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Note that descriptions will be given in the following order.
1. Background
2. Outline of Data Management System of Present Embodiment
   3. Functional Configuration of Each Device
   4. Operation of Deposit Destination Node
   5. Variation
   6. Hardware Configuration of Each Device
   7. Conclusion

1. Background

First, a background of the present disclosure will be described.

As mentioned above, in general, in a case where a depositor deposits some important data to another person, the depositor deposits the data to a reliable person. In a case where the depositor deposits data to an unreliable person, the depositor is required to verify that a custodian retains the data properly (e.g., the custodian has not tampered with the data, has not erased the data, etc.).

Here, a considerable amount of cost is required to verify that the custodian retains the data properly. For example, it is conceivable to verify that the custodian retains the data properly by developing an application or an encryption method for detecting tampering. However, it is not easy to independently develop the application or the encryption method, and a considerable amount of cost is required.

Furthermore, according to the technique disclosed in Patent Document 1, for example, an insider (administrator of a storage server, etc.) can tamper with assurance data itself, whereby the depositor cannot detect tampering in a case where the insider has tampered with deposited data and the assurance data.

In view of the above circumstances, the person who discloses the present disclosure has developed the techniques related to the present disclosure. Hereinafter, an outline of a data management system according to an embodiment of the present disclosure will be described.

2. Outline of Data Management System of Present Embodiment

The data management system according to the present disclosure is a system in which a depositor can deposit desired data for any period of time. The depositor who can use the present system is not particularly limited. For example, various organizations, such as companies, and individuals can use the present system. Furthermore, data to be deposited in the present system is also not particularly limited. For example, data related to various kinds of business (data containing trade secrets of companies, etc.), personal data (photos, videos, music, movies, TV shows, games, etc.), and the like may be deposited in the present system. Furthermore, data to be deposited in the present system may be encrypted by any encryption method.

Furthermore, the data management system according to the present embodiment uses a distributed peer-to-peer database provided via a peer-to-peer network. Note that a peer-to-peer network may be referred to as a peer-to-peer distributed file system. Hereinafter, a peer-to-peer network may be referred to as a "P2P network", and a peer-to-peer database may be referred to as a "P2P database". In the present specification, an exemplary case where blockchain data provided via a P2P network is used will be described as an example of a P2P database.

2-1. Outline of General Blockchain System

Before describing the data management system according to the present embodiment, first, an outline of a general blockchain system will be described with reference to FIG. 1. FIG. 1 is an explanatory diagram illustrating an outline of general blockchain data. As illustrated in FIG. 1, blockchain data is data in which a plurality of blocks is connected in chains. Then, in each of the blocks, one or more types of information can be stored as transactions. Examples of a service that uses a blockchain system include Bitcoin. In Bitcoin, information associated with exchange of virtual currency can be stored as a transaction.

As illustrated in FIG. 1, the blockchain data includes special values called, for example, a "hash value of the immediately preceding block" and a "nonce".

The "hash value of the immediately preceding block" is information for concatenating a block and the immediately preceding block, which is a hash value of the entire data included in the immediately preceding block (or a part of the data included in the immediately preceding block), or the like. Furthermore, the "hash value of the immediately preceding block" also functions to detect, for example, whether or not data included in each block of the blockchain has been tampered. More specifically, in a case where transaction data included in any of the blocks of the blockchain has been tampered, the hash value of the entire data included in the block (or a part of the data included in the block) changes so that inconsistency occurs in the "hash value of the immediately preceding block" included in a block following the block, whereby it can be detected whether or not the data has been tampered.

Furthermore, the "nonce" is information used in a process of determining a node to which a new block is added from among nodes connected to the P2P network. More specifically, in a case where a new block is added to the blockchain, a node connected to the P2P network outputs a hash value of the entire data included in the block (or a part of the data included in the block) while variously changing the "nonce" in the block to be added, for example. Then, the node that has first succeeded in generating a hash value that satisfies a predetermined condition (in other words, the node that has first succeeded in finding a nonce that generates a hash value satisfying a predetermined condition) can add the new block in the blockchain.

The process is referred to as, for example, mining in Bitcoin, in which the node that has first succeeded in finding a nonce with which the calculated hash value is less than a predetermined value can add a new block in the blockchain. In the process described above, a time required for the process can be adjusted by appropriately changing the "predetermined condition".

In this manner, a node that can add a new block in the blockchain is not determined in advance, and is not limited to a specific node, whereby a service utilizing the blockchain can prevent fraud by a specific node and can secure fairness of the service. Note that examples of the "nonce" include a character string, a number string, and data including a combination thereof.

Furthermore, a transaction included in each block of the blockchain is attached with an electronic signature using a secret key owned by a node (or a user). With the electronic signature being attached to a transaction, what is called "spoofing", data tampering, and the like can be detected.

Note that the transaction data included in each block of the blockchain may be encrypted as appropriate. More specifically, a transaction in each block of Bitcoin is unencrypted and is attached with an electronic signature using a secret key, and each transaction is public. Meanwhile, there has been a technique of causing a blockchain of Bitcoin to keep digital assets, such as Colored Coin. In such a case, it is possible to design in such a manner that only a specific device (device capable of decrypting encrypted data) holding a corresponding encryption key can understand the content of data on the blockchain.

Furthermore, the blockchain system can also include other data different from virtual currency in the blockchain data used to exchange existing virtual currency data, such as blockchain data of Bitcoin, by using sidechain techniques of Bitcoin, for example.

2-2. Configuration of Data Management System of Present Embodiment

Figure 2:
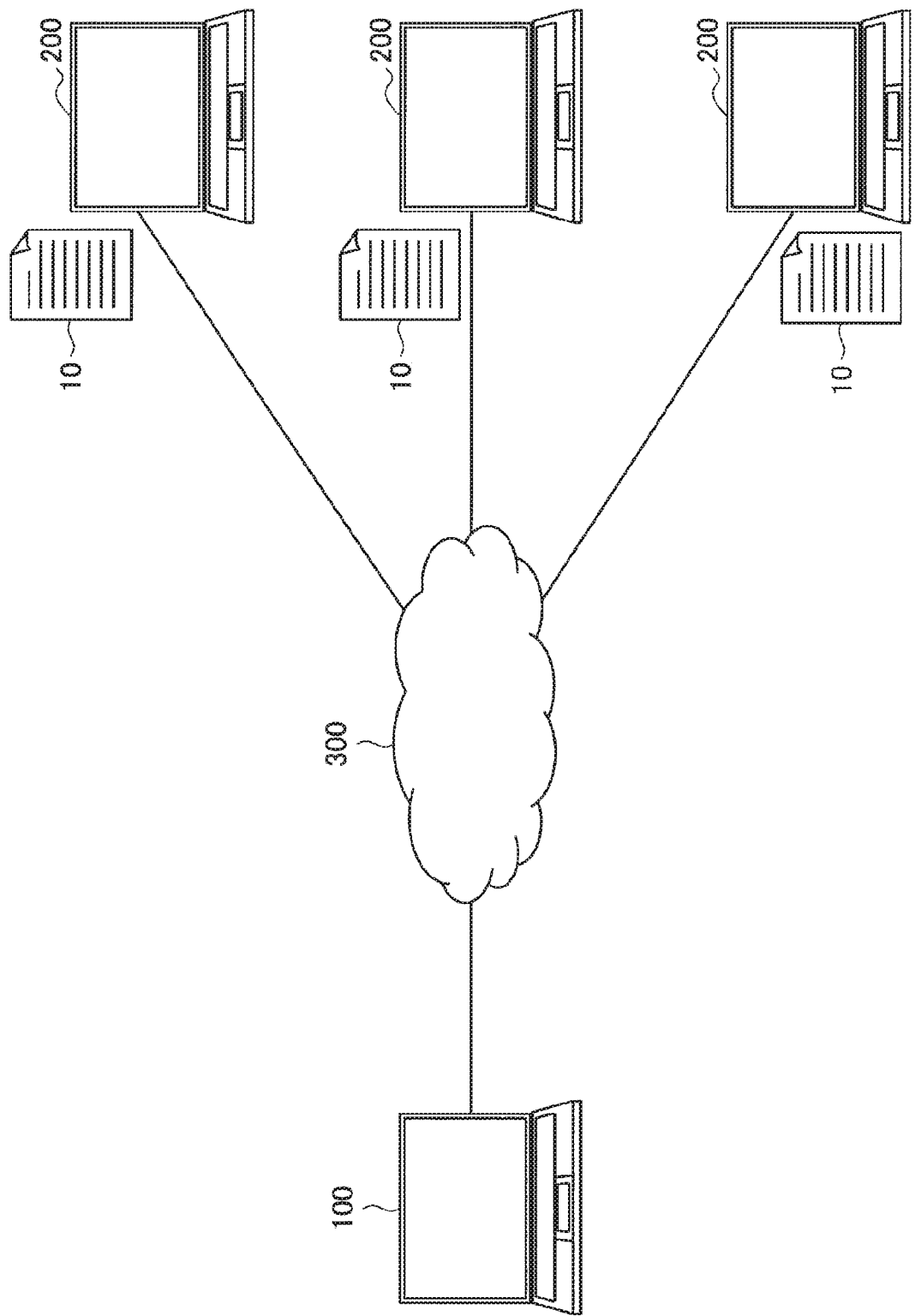
FIG. 2 is a diagram illustrating a configuration of a data management system according to the present embodiment.

The foregoing has described the outline of a general blockchain system. Next, a configuration of the data management system according to the present embodiment will be described with reference to FIG. 2. FIG. 2 is a diagram illustrating a configuration of the data management system according to the present embodiment.

As illustrated in FIG. 2, the data management system according to the present embodiment includes a node (hereinafter referred to as "deposit source node 100" for convenience) that deposits data to be deposited (hereinafter referred to as "target data 10" for convenience), and a node (hereinafter referred to as a "deposit destination node 200" for convenience) that retains the target data 10. Then, the deposit source node 100 and the deposit destination node 200 are connected to a P2P network 300. Although FIG. 2 illustrates only one deposit source node 100 and three deposit destination nodes 200, FIG. 2 is merely an example, and the number of the deposit source nodes 100 and the number of the deposit destination nodes 200 are optional. Furthermore, although the deposit source node 100 and the deposit destination node 200 are separately illustrated in FIG. 2, the deposit source node 100 and the deposit destination node 200 can be implemented by the same information processing apparatus. In other words, an information processing apparatus that functions as the deposit source node 100 may also function as the deposit destination node 200.

(Deposit Source Node 100)

The deposit source node 100 is an information processing apparatus that deposits the target data 10 to the deposit destination node 200 and requests verification of the target data 10. Here, the verification indicates a process of confirming that the target data 10 is stored properly. More specifically, the verification indicates a process of confirming that the target data 10 has not been erased, or the target data 10 has not been tampered or the like. Details of the verification according to the present embodiment will be described later.

The deposit source node 100 discloses information associated with solicitation of a storage destination of the target data 10 to a plurality of the deposit destination nodes 200, thereby soliciting a storage destination of the target data 10. Here, a method of soliciting the storage destination of the target data 10 is optional. For example, the deposit source node 100 may upload the information associated with solicitation of the storage destination of the target data 10 to a predetermined website on the Internet, thereby disclosing the information to the plurality of deposit destination nodes 200.

Then, the deposit source node 100 provides the target data 10 to the deposit destination node 200 that has agreed to store the target data 10. Here, a method of providing the target data 10 is optional. For example, the deposit source node 100 may provide the target data 10 to the deposit destination node 200 via the P2P network 300, or may provide the target data 10 to the deposit destination node 200 via the Internet.

Furthermore, the deposit source node 100 notifies the deposit destination node 200 of various kinds of information associated with the storage or the verification of the target data 10. Here, the various kinds of information associated with the storage or the verification of the target data 10 may be any kind of information. For example, the deposit source node 100 notifies the deposit destination node 200 of information associated with a size of the target data 10, a period, conditions, a method, and a consideration of the storage or the verification, a payment method of the consideration, a budget serving as a source of the consideration, and the like. Furthermore, a method of notifying those kinds of information is optional. For example, the deposit source node 100 may disclose those kinds of information on a predetermined website on the Internet.

Furthermore, the deposit source node 100 confirms, after depositing the target data 10 in the plurality of deposit destination nodes 200, a storage status or a verification status of the target data 10 (hereinafter, the "storage status or verification status" may be referred to as a "verification status" for convenience). Here, a method of confirming the verification status of the target data 10 is optional. For example, the deposit source node 100 may obtain the blockchain data from the P2P network 300 to confirm the verification status of the target data 10 on the basis of the blockchain data, or may obtain predetermined information indicating a verification status of the target data from the P2P network 300 to confirm the verification status of the target data 10 on the basis of the information.

Details of the processing of the deposit source node 100 will be described later.

(Deposit Destination Node 200)

The deposit destination node 200 is an information processing apparatus that receives the target data 10 from the deposit source node 100 and verifies the target data 10.

For example, the deposit destination node 200 notifies the deposit source node 100 of information indicating that it agrees to store the target data 10. Here, a method of notifying the information indicating that it agrees to store the target data 10 is optional. For example, the deposit destination node 200 may notify the deposit source node 100 of the information indicating that it agrees to store the target data 10 via a predetermined website on the Internet in which the deposit source node 100 discloses the information associated with the solicitation of the storage destination of the target data 10.

Then, the deposit destination node 200 obtains the target data 10 from the deposit source node 100. Here, a method of obtaining the target data 10 is optional. For example, the deposit destination node 200 may obtain the target data 10 from the deposit source node 100 via the P2P network 300, or may obtain the target data 10 from the deposit source node 100 via the Internet.

Furthermore, the deposit destination node 200 obtains blockchain data from the P2P network 300, and verifies the target data 10 using the blockchain data. Details of the verification will be described later.

2-3. Functional Overview of Data Management System of Present Embodiment

The foregoing has described the configuration of the data management system according to the present embodiment. Next, a functional overview of the data management system according to the present embodiment will be described.

As described above, information called "nonce" is used at the time of updating general blockchain data. Meanwhile, in the data management system according to the present embodiment, the deposit destination node 200 uses data obtained from the target data 10 (hereinafter, it may be referred to as "first data" for convenience) instead of the "nonce" (equivalent to a use of the first data as the "nonce"). More specifically, a certain deposit source node 100 deposits the target data 10 to a plurality of the deposit destination nodes 200 participating in the P2P network, and the deposit destination nodes 200 that have received the target data 10 use, for example, a bit string included in the target data 10 instead of the "nonce" to calculate a hash value of the entire data included in the block to be added (or a part of the data included in the block to be added).

Then, the deposit destination nodes 200 continue to change the first data and to calculate the hash value until the calculated hash value satisfies a predetermined condition (hereinafter, the process may be referred to as a "challenge" for convenience). Then, the deposit destination node 200 that has first succeeded in calculating a hash value satisfying the predetermined condition (in other words, that has first succeeded in the challenge) can add a new block in the blockchain. Note that the process of calculating the hash value is merely an example, and the deposit destination node 200 may execute optional data processing other than the calculation of the hash value.

Each configuration of the P2P network (each device, a program of each device, a communication means of each device, etc.) is designed such that the process described above is continued autonomously, whereby the data management system according to the present embodiment can prevent the target data 10 from being tampered. More specifically, in a case where the target data 10 has been tampered or the like, a hash value of the entire data of any of the blocks included in the blockchain (or a part of the data included in the block) does not satisfy a predetermined condition, whereby tampering or the like of the target data 10 can be detected. In this manner, the data management system according to the present embodiment can implement verification of the target data 10 more properly by using the first data obtained from the target data 10 instead of the "nonce".

More specifically, in a case where the target data 10 is entrusted to a predetermined storage service, there is a possibility that the target data 10 is tampered or erased by a malicious outsider attacking the storage service or a malicious administrator of the storage service performing predetermined operation. In particular, in a case where a company, a government, or the like having a significant influence in related industries has tampered or erased the target data 10, the facts or evidence may be destroyed. Meanwhile, the data management system according to the present embodiment can deposit the target data 10 to a plurality of anonymous custodians, whereby a possibility that the target data 10 is tampered or erased due to attacking of a malicious outsider can be reduced.

Furthermore, the data management system according to the present embodiment treats the target data 10 as data separate from the blockchain data, whereby a size of the blockchain data can reduced as compared with, for example, a method in which the target data 10 is inserted into the blockchain data or the target data 10 is added to the blockchain data.

Furthermore, the data management system according to the present embodiment can make effective use of the resources of each of the deposit destination nodes 200. More specifically, for example, a plurality of nodes participating in the mining of Bitcoin changes the "nonce" until the mining succeeds, and continues the process of calculating the hash value of the entire data included in the block (or a part of the data included in the block). In other words, it cannot be said that the resources of the nodes are effectively utilized by the process of calculating the hash value performed until the mining succeeds. Meanwhile, the data management system according to the present embodiment can verify the target data 10 by using the process of calculating the hash value in the challenge, whereby it can be said that the resources of the deposit destination nodes 200 are effectively utilized. Furthermore, the present disclosure may also be applied to other blockchain services.

Furthermore, the depositor according to the present embodiment sets a budget to be a source of a consideration for storage or verification of the target data 10. Here, a method of setting the budget or a method of exchanging reward is optional. For example, the depositor of the target data 10 specifies a budget by a predetermined method and the budget is pooled on the P2P network 300, whereby the deposit destination nodes 200 that have succeeded in the challenge may be allowed to obtain reward from the pool. Furthermore, the deposit source node 100 may confirm the deposit destination nodes 200 that have succeeded in the challenge at an optional timing, and may pay the reward to those deposit destination nodes 200 by individually making remittance via the P2P network 300. Furthermore, at the time when the depositor collects the target data 10, the reward may be distributed from the budget on the basis of contribution (e.g., the number of times each deposit destination node 200 has added a block) of each of the deposit destination nodes 200. According to those methods, the custodian of the target data 10 can receive a fair consideration for storage or verification of the target data 10 at a certain probability.

Furthermore, the data management system according to the present embodiment can confirm a verification status of the target data 10 and can present information associated with a result of the confirmation to the depositor. Here, a method of confirming the verification status of the target data 10 or a method of presenting the information associated with a result of the confirmation is optional. For example, the deposit source node 100 may obtain blockchain data from the P2P network 300 at an optional timing, and may confirm a status of addition of a block (e.g., date and time when a block is added most recently) on the basis of the blockchain data to confirm the verification status of the target data 10. Furthermore, information associated with the number of the deposit destination nodes 200 that store and verify the target data 10, the status of addition of a block, and the balance of the budget, and the like may be summarized on a predetermined website on the Internet, for example, and the deposit source node 100 may access the website to confirm the verification status of the target data 10.

Furthermore, the depositor of the target data 10 may change the budget at any time on the basis of the verification status of the target data 10. For example, in a case where the number of the deposit destination nodes 200 that store and verify the target data 10 has decreased, the depositor may increase the budget to increase the number of the deposit destination nodes 200 that store and verify the target data 10. Furthermore, in a case where a block has not been added for a predetermined period of time or more, the depositor may increase the budget to cause each of the deposit destination nodes 200 to perform verification (challenge).

2-4. Outline of Blockchain Data of Present Embodiment

Figure 3:
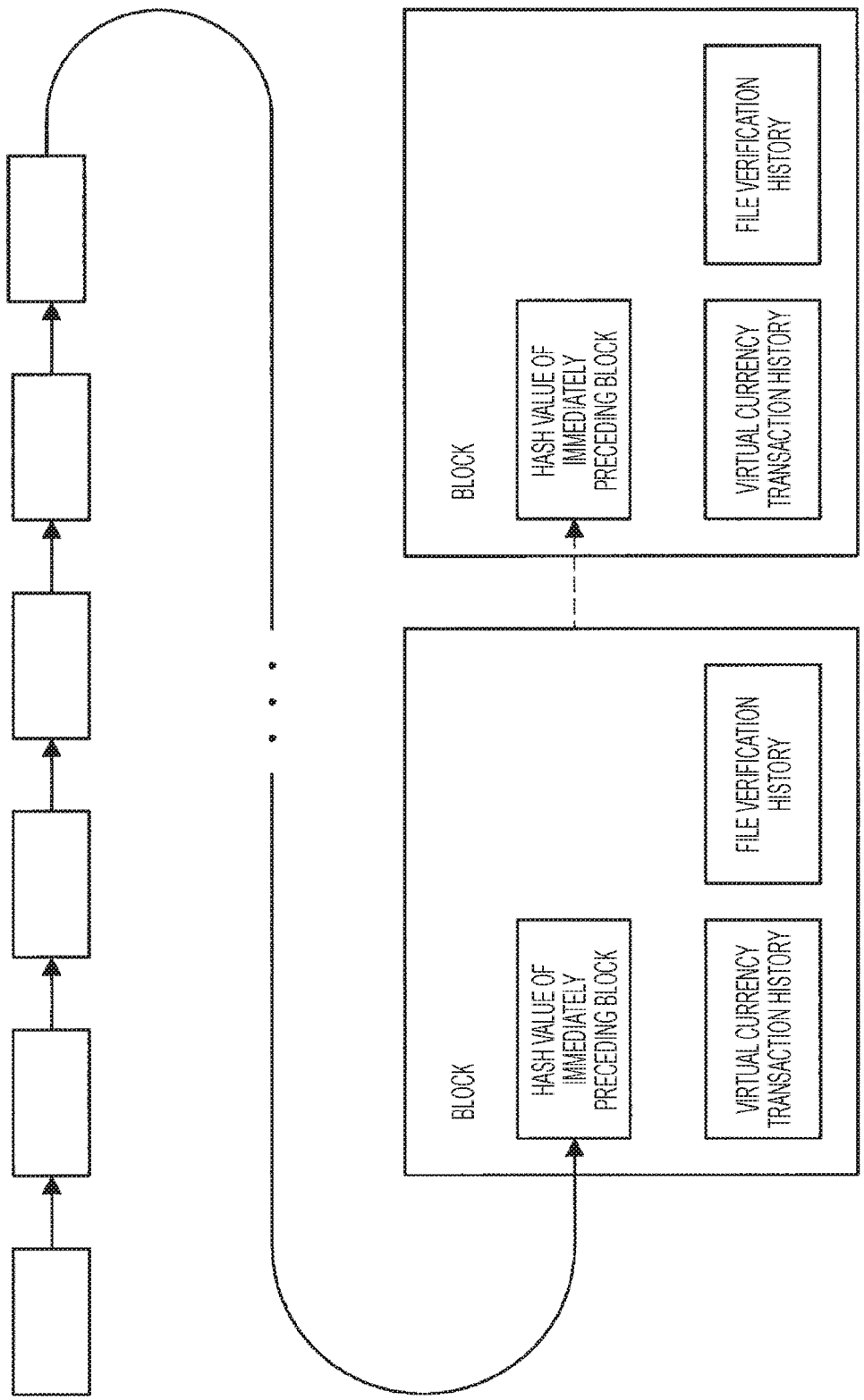
FIG. 3 is an explanatory diagram illustrating an outline of blockchain data according to the present embodiment.

Next, an outline of blockchain data according to the present embodiment will be described with reference to FIG. 3. FIG. 3 is an explanatory diagram illustrating the outline of the blockchain data according to the present embodiment. As illustrated in FIG. 3, each block of the blockchain data according to the present embodiment includes a "hash value of the immediately preceding block", a "file verification history", and a "virtual currency transaction history". Hereinafter, each data will be described in detail.

2-4-1. File Verification History

First, the "file verification history" will be described. The "file verification history" according to the present embodiment includes information associated with the first data obtained from the target data 10. Here, the information included in the "file verification history" according to the present embodiment will be described with reference to FIG. 4. FIG. 4 is a table illustrating exemplary information included in the "file verification history" according to the present embodiment.

As illustrated in FIG. 4, the "file verification history" according to the present embodiment includes "FileID", "FilePartNum", and "FileData". Note that the information illustrated in FIG. 4 is merely an example, and the information included in the "file verification history" according to the present embodiment can be changed as appropriate.

"FileID" is information for identifying the target data 10. For example, "FileID" may be a hash value of the entire target data 10 (FIG. 4 illustrates {7fee20 . . . 0a} as an example). In a case where the deposit destination node 200 retains a plurality of the target data 10, the deposit destination node 200 can identify, on the basis of the information set in the "FileID", which target data 10 the information is associated with. Note that this is merely an example, and the identification information of the target data 10 set in "FileID" can be changed as appropriate.

"FilePartNum" is information indicating a target range of a challenge in the target data 10 at the time when the deposit destination node 200 executes a challenge. More specifically, the deposit destination node 200 participating in the challenge sets a bit string included in a part of the range of the target data 10 designated by "FilePartNum", instead of the entire target data 10, as the first data in "FileData", and executes a challenge.

Accordingly, the data management system according to the present embodiment can adjust the difficulty of the challenge by changing the setting of "FilePartNum", and can adjust a time required for the success of the challenge. For example, the data management system according to the present embodiment can set a wider target range of the challenge specified by "FilePartNum" in a case where a time required for the success of the challenge is desired to be longer, or can set a narrower target range of the challenge specified by "FilePartNum" in a case where the time required for the success of the challenge is desired to be shorter, on the basis of past records of the time required for the success of the challenge.

Furthermore, the data management system according to the present embodiment can adjust the amount of reward at the time when the challenge succeeds according to "FilePartNum" (in other words, depending on the difficulty of the challenge). For example, in a case where the target range of the challenge specified by "FilePartNum" is set to be wider, the data management system according to the present embodiment may set the amount of reward to be paid at the time when the challenge succeeds to be higher. Furthermore, in a case where the target range of the challenge specified by "FilePartNum" is set to be narrower, the data management system according to the present embodiment may set the amount of reward to be paid at the time when the challenge succeeds to be lower.

Furthermore, the data management system according to the present embodiment can also change the setting of "FilePartNum" depending on the balance of the budget. For example, in a case where the balance of the budget has become lower than a predetermined value, the data management system according to the present embodiment may set the target range of the challenge specified by "FilePart-Num" to be narrower so that the difficulty of the challenge is lowered, thereby setting the amount of reward to be lower.

Note that a method of specifying the target range of the challenge based on "FilePartNum" is optional. For example, "FilePartNum" may be information associated with a divided range obtained by the target data 10 being divided into a plurality of ranges (e.g., it may be information indicating a third range obtained by the target data 10 being divided into 23 pieces (FIG. 4 illustrates {3/23} for convenience)).

Furthermore, although the foregoing has described that a part of the range of the target data 10 is specified in "FilePartNum", this is merely an example, and information to be set in "FilePartNum" can be changed as appropriate. For example, some kind of information related to the target data 10 (information associated with a size, storage location, data type, created date and time, creator, updated date and time, updater, and the like of the target data 10) may be set in "FilePartNum".

Furthermore, a device for specifying "FilePartNum" is optional. For example, "FilePartNum" may be specified using a predetermined method by the deposit destination node 200 that has succeeded in the challenge at the time of the previous block addition, or may be specified by each deposit destination node 200 itself using the predetermined method. In the present specification, as an example, "FilePartNum" is assumed to be specified by the deposit destination node 200 that has succeeded in the challenge at the time of the previous block addition. For example, the deposit destination node 200 that has succeeded in the challenge also provides information associated with "FilePartNum" to be used for the next challenge when broadcasting information associated with a block to be added to another deposit destination node 200, and each deposit destination node 200 executes the next challenge on the basis of the information associated with "FilePartNum".

Furthermore, a method of setting "FilePartNum" is optional. For example, the deposit destination node 200 that has succeeded in the challenge may input predetermined information (e.g., information regarding "FilePartNum" or "FileData" at the time when the challenge has succeeded) to a predetermined program distributed in advance, thereby setting "FilePartNum" for the next challenge. Furthermore, in a case where the target data 10 is divided into a plurality of ranges and information associated with the divided range is set in "FilePartNum", the deposit destination node 200 that has succeeded in the challenge may set a range not previously set as the target range to "FilePartNum".

Information associated with the first data is set in "FileData". For example, in a case where the first data is a bit string having a certain bit length, the number of bytes (hereinafter referred to as "Offset" for convenience) starting from the beginning of the target range of the challenge specified by "FilePartNum" and a data length (hereinafter referred to as "Len" for convenience) starting from "Offset" (e.g., data indicating that Offset is 2,115th byte and Len is 37 bytes (FIG. 4 illustrates {2115/37} for convenience)) may be set in "FileData" as data indicating the beginning of the bit string.

In this manner, the content set in "FileData" is not actual data but Offset and Len, whereby "FileData" can have a constant size.

Note that an electronic signature generated by a secret key of the deposit destination node 200 may be attached to the "file verification history". As a result, it becomes possible to verify whether or not what is called "spoofing" has occurred or the "file verification history" has been tampered.

2-4-2. Virtual Currency Transaction History

The "virtual currency transaction history" includes information associated with reward for storage or verification of the target data 10. For example, the "virtual currency transaction history" includes information associated with reward to be paid to the deposit destination node 200 that has succeeded in the challenge.

Here, as described above, a method of exchanging the reward for the success of the challenge is optional. In the present specification, as an example, an exemplary case where the depositor of the target data 10 specifies a budget by a predetermined method and the budget is pooled on the P2P network 300 so that the deposit destination node 200 that has succeeded in the challenge obtains reward from the pool will be described.

Here, a method of generating the "virtual currency transaction history" is optional. For example, a predetermined program may be distributed in advance to each deposit destination node 200, and the deposit destination node 200 that has succeeded in the challenge may generate the "virtual currency transaction history" using the program. The deposit destination node 200 can obtain the reward from the pool by including the generated "virtual currency transaction history" in the block. In this manner, generation of the "virtual currency transaction history" is carried out only by a predetermined program, whereby the data management system according to the present embodiment can prevent an enormous amount of reward from being obtained by a malicious custodian.

Here, an example of the information included in the "virtual currency transaction history" according to the present embodiment will be described with reference to FIG. 5. FIG. 5 is a table illustrating exemplary information included in the "virtual currency transaction history" according to the present embodiment.

As illustrated in FIG. 5, the "virtual currency transaction history" according to the present embodiment includes an "input" field and an "output" field, and the "input" field includes a "transaction history number", an "electronic signature", and a "public key of the pool". Furthermore, the "output" field includes an "amount of reward" and a "hash value of a public key of a deposit destination node". Note that the information illustrated in FIG. 5 is merely an example, and the information included in the "virtual currency transaction history" according to the present embodiment can be changed as appropriate.

The "transaction history number" is optional information capable of identifying a transaction related to transfer of reward. For example, the "transaction history number" may be a time stamp at the time when the challenge has succeeded, a serial number that is incremented by a predetermined value (e.g., by "1") each time a transaction related to transfer of reward occurs, or the like. The data management system according to the present embodiment can prevent double acquisition of the reward by providing the "transaction history number" and the "electronic signature" to be described later in the "virtual currency transaction history".

The "electronic signature" is electronic signature data generated by a secret key of the pool. Accordingly, with the electronic signature data being verified by the "public key of the pool" included in the "virtual currency transaction history", it becomes possible to verify whether or not the "virtual currency transaction history" has been tampered or whether or not what is called "spoofing" has occurred.

The "amount of reward" is information associated with an amount of reward obtained by the deposit destination node 200 that has succeeded in the challenge. For example, a predetermined amount of virtual currency is set in the "amount of reward" as reward for a successful challenge. The amount of reward may be a fixed amount, may be changed at any time depending on the depositor, or may be changed depending on the difficulty of the change.

The "hash value of a public key of a deposit destination node" is a hash value of the public key of the deposit destination node 200 that has succeeded in the challenge. With the "hash value of a public key of a deposit destination node" being included in the "virtual currency transaction history", the deposit destination node 200 that has succeeded in the challenge and has obtained the reward can be identified. It is merely an example that the "hash value of a public key of a deposit destination node" is included in the "virtual currency transaction history", and may be changed as appropriate. For example, a "hash value of a public key of a custodian" or the like may be included instead of the "hash value of a public key of a deposit destination node".

2-4-3. Hash Value of Immediately Preceding Block

As described above, the "hash value of the immediately preceding block" is information for connecting the block and the immediately preceding block, which is a hash value of the entire data included in the immediately preceding block (or a part of the data included in the immediately preceding block) (note that the "hash value of the immediately preceding block" is used as "second data" in the present embodiment).

3. Functional Configuration of Each Device

3-1. Deposit Source Node 100

Figure 6:
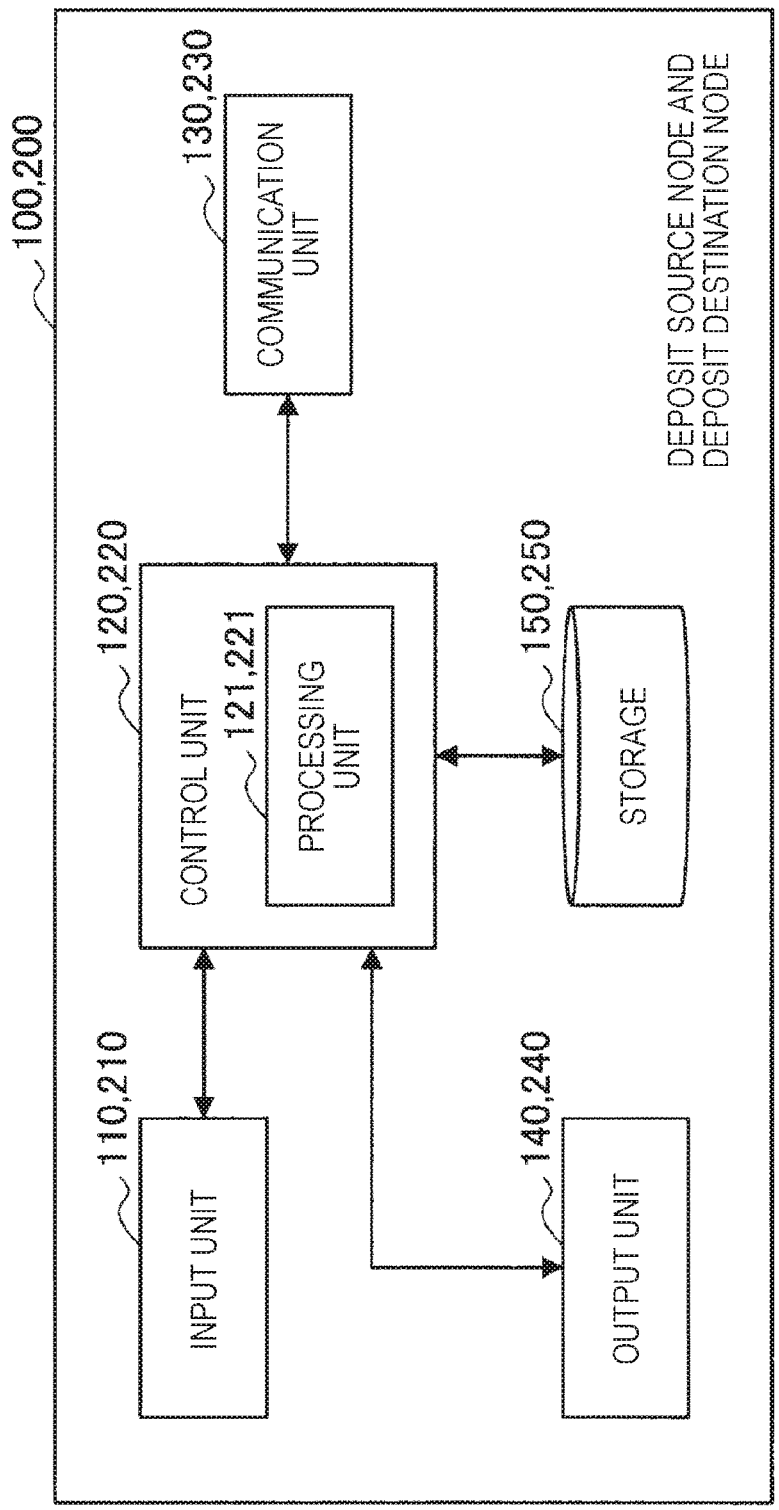
FIG. 6 is a table illustrating a functional configuration of a deposit source node and a deposit destination node according to the present embodiment.

The foregoing has described the outline of the data management system according to the present embodiment. Next, a functional configuration of each device according to the present embodiment will be described with reference to FIG. 6. FIG. 6 is a table illustrating a functional configuration of the deposit source node 100 and the deposit destination node 200 according to the present embodiment.

First, a functional configuration of the deposit source node 100 according to the present embodiment will be described. As illustrated in FIG. 6, the deposit source node 100 according to the present embodiment includes an input unit 110, a control unit 120, a communication unit 130, an output unit 140, and a storage 150. Furthermore, the control unit 120 includes a processing unit 121.

(Input Unit 110)

The input unit 110 has a functional configuration for receiving input from the depositor. More specifically, the input unit 110 includes various devices (a keyboard, mouse, keypad, touch panel, microphone, operation button, direction key, rotary selector such as jog dial, etc.) used for input, and the depositor performs various kinds of input operation using those devices. For example, the depositor inputs the target data 10 and various kinds of information associated with storage or verification of the target data 10 (information associated with a size of the target data 10, a period, conditions, a method, and a consideration of the storage or the verification, a payment method of the consideration, a budget serving as a source of the consideration, etc.) using the various devices included in the input unit 110. Note that those kinds of information are merely examples, and the information to be input from the input unit 110 is optional. The input unit 110 generates input information on the basis of input operation made by the depositor, and provides the input information to the control unit 120 to be described later.

(Control Unit 120)

The control unit 120 centrally controls the deposit source node 100. More specifically, the control unit 120 centrally controls various processes from the start to the end of the storage or the verification of the target data 10 on the basis of the input information provided from the input unit 110, reception information provided from the communication unit 130 to be described later, and the like. Note that the processes controlled by the control unit 120 are not limited to them. For example, the control unit 120 may control processes generally executed in a server, a personal computer (PC), a tablet PC, or the like. Furthermore, the control unit 120 includes the processing unit 121 as described above.

(Processing Unit 121)

The processing unit 121 performs processes related to the storage or the verification of the target data 10. For example, the processing unit 121 performs a process of disclosing information associated with solicitation of a storage destination of the target data 10 to a plurality of deposit destination nodes 200 on the basis of the input information provided from the input unit 110 and the like. Here, specific contents of the process are optional. For example, the processing unit 121 may generate the information associated with solicitation of a storage destination of the target data 10 and upload the information to a predetermined website on the Internet, thereby disclosing the information to the plurality of deposit destination nodes 200.

Furthermore, the processing unit 121 performs a process of providing the target data 10 to the plurality of deposit destination nodes 200. Here, specific contents of the process are optional. For example, the processing unit 121 may perform a process of providing the target data 10 to the deposit destination nodes 200 via the P2P network 300, or may perform a process of providing the target data 10 to the deposit destination nodes 200 via the Internet.

Furthermore, the processing unit 121 functions as a verification request unit that requests verification (or a start of verification) to each of the deposit destination nodes 200. More specifically, the processing unit 121 controls a process of transmitting notification for requesting verification (or a start of verification) to the P2P network 300. Accordingly, each of the deposit destination nodes 200 receives the notification via the P2P network 300, and recognizes that verification (or a start of verification) of the target data 10 is requested.

Furthermore, the processing unit 121 performs a process of notifying the deposit destination node 200 of various kinds of information associated with storage or verification of the target data 10 (information associated with a size of the target data 10, a period, conditions, a method, and a consideration of the storage or the verification, a payment method of the consideration, a budget serving as a source of the consideration, etc.). Here, specific contents of the process are optional. For example, the processing unit 121 may notify the deposit destination node 200 of those kinds of information via the P2P network 300, or may notify the deposit destination node 200 of those kinds of information by disclosing the information on a predetermined website on the Internet.

Furthermore, the processing unit 121 also functions as a confirmation unit for confirming a storage status or a verification status of the target data 10. Here, specific contents of the process are optional. More specifically, the processing unit 121 obtains blockchain data regarding the target data 10 from the P2P network 300, and confirms an addition status of blocks to the blockchain (a date and time when a block is added most recently, the number of times a block is added, the deposit destination node 200 to which a block is added, etc.), an exchange status of reward (the amount of reward that has been transferred, the balance of the budget, etc.), and the like. Furthermore, those described above are merely examples, and the information confirmed by the processing unit 121 is optional. For example, the processing unit 121 may confirm the number of the deposit destination nodes 200 that store and verify the target data 10. Then, the processing unit 121 provides the various kinds of information that have been confirmed to the output unit 140 to be described later, thereby implementing output of those kinds of information.

When the various kinds of processes described above are performed, the control unit 120 (including the processing unit 121) generates control signals for controlling respective functional configurations and provides them to the respective functional configurations, and various kinds of information (input information from the input unit 110, reception information from the communication unit 130, etc.) are provided from the respective functional configurations.

(Communication Unit 130)

The communication unit 130 communicates with an external device. More specifically, the communication unit 130 is connected to the P2P network 300 or another network, and communicates with a plurality of deposit destination nodes 200 or other external devices via those networks. For example, in the case of transmission, the communication unit 130 transmits, on the basis of the control signals from the control unit 120, information associated with solicitation of a storage destination of the target data 10, the target data 10, various kinds of information associated with the storage or the verification of the target data 10 (information associated with a size of the target data 10, a period, conditions, a method, and a consideration of the storage or the verification, a payment method of the consideration, a budget serving as a source of the consideration, etc.), and the like. Furthermore, in the case of reception, the communication unit 130 receives information indicating that it agrees to store the target data 10, blockchain data, and the like, and provides those pieces of information to the control unit 120 as reception information. Note that the information mentioned above is merely an example, and the communication unit 130 may transmit and receive other kinds of information.

(Output Unit 140)

The output unit 140 outputs various kinds of information. More specifically, the output unit 140 includes various devices (display (liquid crystal display, organic electroluminescence (EL) display, etc.), projector, printer, plotter, speaker, etc.) to be used for output, and performs various kinds of output on the basis of the control signals provided from the control unit 120. For example, the output unit 140 may display, on a display, information associated with various processes from the start to the end of the storage or the verification of the target data 10, thereby providing various kinds of information to the depositor.

(Storage 150)

The storage 150 stores various kinds of information. For example, the storage 150 stores information associated with solicitation of a storage destination of the target data 10, the target data 10, various kinds of information associated with the storage or the verification of the target data 10 (information associated with a size of the target data 10, a period, conditions, a method, and a consideration of the storage or the verification, a payment method of the consideration, a budget serving as a source of the consideration, etc.), information indicating that it agrees to store the target data 10, blockchain data, and the like. Note that those kinds of information are merely examples, and the information stored in the storage 150 can be changed as appropriate. For example, the storage 150 may store programs, parameters, and the like used by each functional configuration of the deposit source node 100.

3-2. Deposit Destination Node 200

Next, a functional configuration of the deposit destination node 200 according to the present embodiment will be described. As illustrated in FIG. 6, the deposit destination node 200 according to the present embodiment includes an input unit 210, a control unit 220, a communication unit 230, an output unit 240, and a storage 250. Furthermore, the control unit 220 includes a processing unit 221.

(Input Unit 210)

The input unit 210 has a functional configuration for receiving input from the custodian. More specifically, in a similar manner to the input unit 110 of the deposit source node 100 described above, the input unit 210 includes various devices (a keyboard, mouse, keypad, touch panel, microphone, operation button, direction key, rotary selector such as jog dial, etc.) used for input, and the custodian performs various kinds of input operation using those devices. For example, the custodian uses various devices included in the input unit 210 to input information indicating that it agrees to store the target data 10, and the like. The input unit 210 generates input information on the basis of input operation made by the custodian, and provides the input information to the control unit 220 to be described later.

(Control Unit 220)

The control unit 220 centrally controls the deposit destination node 200. More specifically, the control unit 220 centrally controls various processes from the start to the end of the storage or the verification of the target data 10 on the basis of the input information provided from the input unit 210, reception information provided from the communication unit 230 to be described later, and the like. In a similar manner to the control unit 120 of the deposit source node 100 described above, the processes controlled by the control unit 220 are optional, and are not limited to the process related to the storage or the verification of the target data 10. For example, the control unit 220 may control processes generally executed in a server, a personal computer (PC), a tablet PC, or the like. Furthermore, the control unit 220 includes the processing unit 221 as described above.

(Processing Unit 221)

The processing unit 221 functions as a verification unit that performs processes related to the verification of the target data 10. For example, the processing unit 221 performs a process of notifying the deposit source node 100 of the information indicating that it agrees to store the target data 10 on the basis of the input information provided from the input unit 210. Here, specific contents of the process are optional. For example, the processing unit 221 may notify the deposit source node 100 of the information indicating that it agrees to store the target data 10 via a predetermined website on the Internet in which the deposit source node 100 discloses the information associated with the solicitation of the storage destination of the target data 10.

Furthermore, the processing unit 221 performs a process of obtaining the target data 10 from the deposit source node 100. Here, specific contents of the process are optional. For example, the processing unit 221 may obtain the target data 10 from the deposit source node 100 via the P2P network 300, or may obtain the target data 10 from the deposit source node 100 via the Internet. Then, the processing unit 221 causes the storage 250 to be described later to store the obtained target data 10.

Furthermore, the processing unit 221 performs a process related to a challenge for updating the blockchain data. More specifically, the processing unit 221 obtains, from the blockchain data, a target range of the challenge and a target value that is a predetermined condition for a successful challenge. Here, the condition for the success of the challenge set as the target value is optional. For example, the target value may indicate, as a condition for the success of the challenge, that the hash value of the entire data included in the block (or a part of the data included in the block) is smaller than a predetermined value.

Furthermore, although the foregoing has described that the difficulty of the challenge is adjusted depending on the setting of the target range of the challenge, the difficulty of the challenge can be adjusted also on the basis of the target value. For example, the data management system according to the present embodiment can change, on the basis of past records of the time required for the success of the challenge, the target value such that the difficulty of the challenge becomes higher in a case where the time required for the success of the challenge is desired to be longer, and can change the target value such that the difficulty of the challenge becomes lower in a case where the time required for the success of the challenge is desired to be shorter.

Then, the processing unit 221 sets "FileData" from the target range of the challenge (e.g., sets "Offset" that is the number of bytes from the beginning of the target range of the challenge, and "Len" that is a data length with "Offset" serving as a starting point), calculates a hash value of the entire data included in the block (or a part of the data included in the block) thereafter, and compares the hash value with the condition for the success of the challenge indicated by the target value. The processing unit 221 continues the challenge until the hash value satisfies the condition for the success of the challenge indicated by the target value. Note that the above is merely an example, and the processing unit 221 may stop the challenge if the challenge does not succeed for a predetermined number of times or a predetermined time. Accordingly, the processing unit 221 can prevent resources from being continuously consumed by the challenge being continued until it succeeds.

Furthermore, in a case where the challenge succeeds, the processing unit 221 adds a new block in the blockchain data (in other words, the blockchain data is updated). Then, the processing unit 221 performs a process of broadcasting information associated with the new block to be added (also referred to as "information associated with update") via the P2P network 300, thereby providing information associated with the fact that the device has succeeded in the challenge and the information associated with the new block to be added to the deposit destination nodes 200 other than the device itself. The processing unit 221 of the deposit destination node 200 that has received the information associated with update confirms whether or not the challenge has succeeded on the basis of the information, and in a case where a success of the challenge has been confirmed, adds a new block in the blockchain data managed by the device itself.

At that time, the processing unit 221 may function as a specification unit for specifying "FilePartNum" to be used for the next challenge. For example, the processing unit 221 may input predetermined information (e.g., information regarding "FilePartNum" or "FileData" at the time when the challenge has succeeded) to a predetermined program distributed in advance, thereby specifying "FilePartNum" for the next challenge.

Note that a branch may occur in the blockchain if the processing units 221 of a plurality of the deposit destination nodes 200 succeed in the challenge at substantially the same timing. More specifically, in a case where the processing units 221 of the plurality of deposit destination nodes 200 succeed in the challenge at substantially the same timing, the respective processing units 221 perform a process of broadcasting information associated with new blocks having different contents at substantially the same timing. In that case, blocks to be added to the blockchain data managed by other deposit destination nodes 200 may be different depending on by which processing unit 221 the information received earlier has been broadcasted (this event is referred to as a branch (or fork) of blockchain).

Here, a method of attending to the event that the branch of the blockchain has occurred is optional. For example, the processing unit 221 of the deposit destination node 200 that intends to add a new block may select the longest chain (hereinafter, it may be referred to as a "branch" for conve- nience) from the branched blockchains, and may perform respective processes (challenge, etc.) such that a new block is added to the branch. Then, in a case where lengths of a plurality of branches differ by a certain value or more, the shorter branch may be discarded to eliminate the branching of the blockchain.

Note that, in the present embodiment, a timing (or frequency, etc.) at which the processing unit 221 performs a challenge for updating the blockchain data is optional. For example, the processing unit 221 of each of the deposit destination nodes 200 may perform a challenge at a specific date and time, may perform a challenge on the basis of any trigger (reception of control signals from an external device, etc.), or may perform a challenge at predetermined intervals of time.

Furthermore, when the various processes described above are performed, the control unit 220 (including the processing unit 221) generates control signals for controlling respective functional configurations and provides them to the respective functional configurations, and various kinds of information (input information from the input unit 210, reception information from the communication unit 230, etc.) are provided from the respective functional configurations.

(Communication Unit 230)

The communication unit 230 communicates with an external device. More specifically, the communication unit 230 is connected to the P2P network 300 or another network, and communicates with the deposit source node 100, the deposit destination nodes 200 other than its own device, or other external devices via those networks. For example, in the case of reception, the communication unit 230 receives the target data 10, blockchain data, information associated with a new block to be added, or the like, and provides those pieces of information to the control unit 220 as reception information. Furthermore, in the case of transmission, the communication unit 230 transmits information indicating that it agrees to store the target data 10 or information associated with a new block to be added on the basis of the control signals from the control unit 220. Note that the information mentioned above is merely an example, and the communication unit 230 may transmit and receive other kinds of information.

(Output Unit 240)

The output unit 240 outputs various kinds of information. More specifically, in a similar manner to the output unit 140 of the deposit source node 100, the output unit 240 includes various devices (display (liquid crystal display, organic electro-luminescence (EL) display, etc.), projector, printer, plotter, speaker, etc.) to be used for output, and performs various kinds of output on the basis of the control signals provided from the control unit 220. For example, the output unit 240 may display, on a display, information associated with various processes from the start to the end of the storage or the verification of the target data 10, thereby providing various kinds of information to the custodian.

(Storage 250)

The storage 250 stores various kinds of information. For example, the storage 250 stores the target data 10 being stored, various kinds of information associated with storage or verification of the target data 10 (information associated with a size of the target data 10, a period, conditions, a method, and a consideration of the storage or the verification, a payment method of the consideration, a budget serving as a source of the consideration, etc.), blockchain data, or the like. Note that those kinds of information are merely examples, and the information stored in the storage 250 can be changed as appropriate. For example, the storage 250 may store programs, parameters, and the like used by each functional configuration of the deposit destination node 200.

4. Operation of Deposit Destination Node 200

Figure 7:
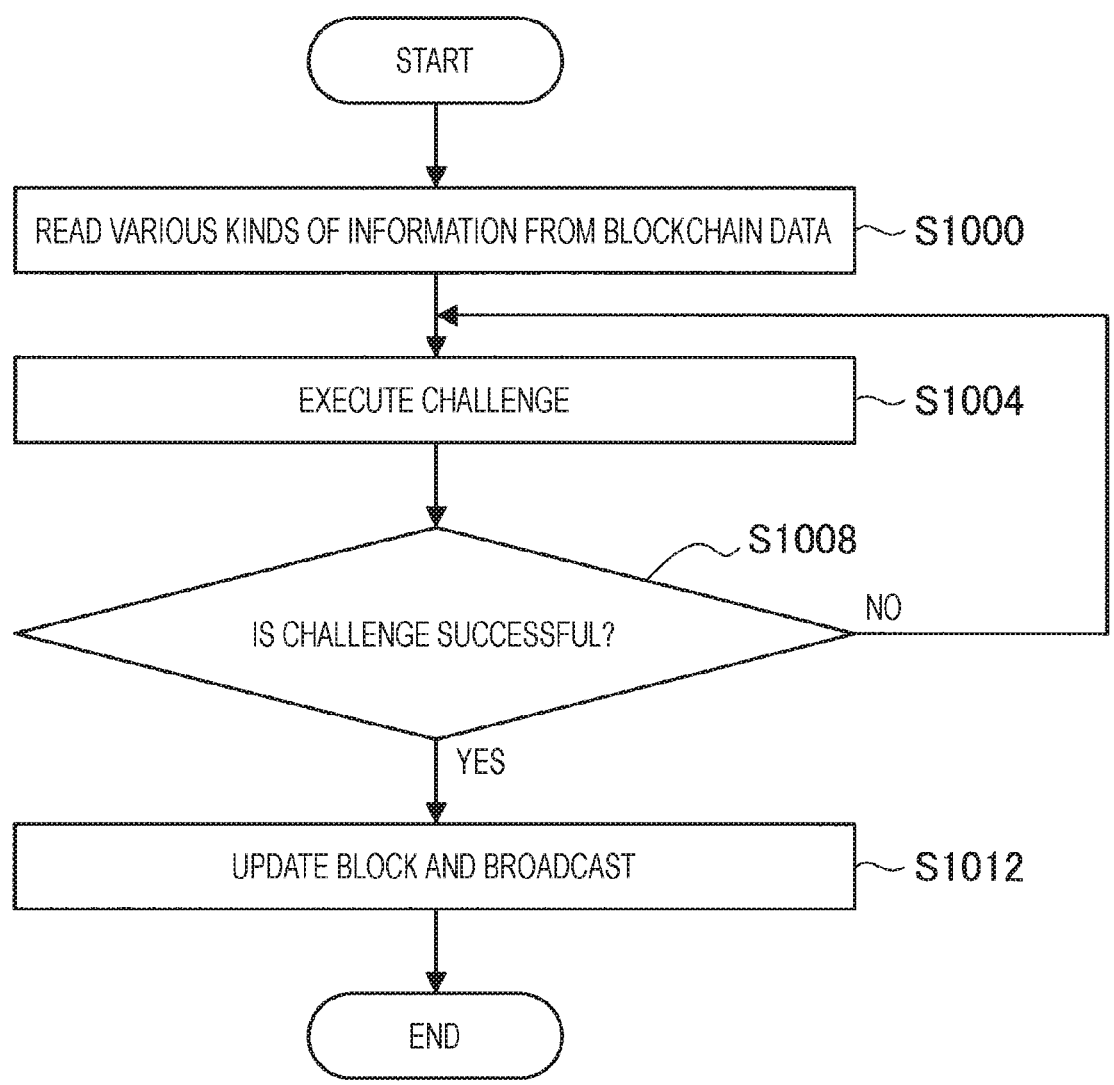
FIG. 7 is a flowchart illustrating operation related to a challenge performed by the deposit destination node according to the present embodiment.

The foregoing has described the functional configuration of each device according to the present embodiment. Next, operation of the deposit destination node 200 according to the present embodiment will be described with reference to FIG. 7. FIG. 7 is a flowchart illustrating operation related to a challenge performed by the deposit destination node 200 according to the present embodiment.

In step S1000, the processing unit 221 of the deposit destination node 200 reads various kinds of information from the blockchain data. More specifically, the processing unit 221 reads, from the blockchain data, a target value that is a condition for a success of the challenge, "FileID" that is information for identifying the target data 10, and "FilePartNum" that is a target range of the challenge. Note that the information read by the processing unit 221 is not limited to those kinds of information.

In step S1004, the processing unit 221 executes the challenge. More specifically, the processing unit 221 sets "FileData" from the target range of the challenge specified by "FilePartNum" in the target data 10 identified by "FileID" (e.g., sets "Offset" that is the number of bytes from the beginning of the target range of the challenge, and "Len" that is a data length with "Offset" serving as a starting point), calculates a hash value of the entire data included in the block (or a part of the data included in the block) thereafter, and compares the calculated hash value with the condition for the success of the challenge indicated by the target value, thereby executing the challenge.

In a case where the hash value of the entire data included in the block (or a part of the data included in the block) satisfies the condition for the success of the challenge (i.e., in a case where the challenge has succeeded) (Yes in step S1008), in step S1012, the processing unit 221 adds a new block to the blockchain data, and performs a process of broadcasting information associated with the new block to be added via the P2P network 300 to provide the deposit destination nodes 200 other than its own device with information associated with the fact that the device has succeeded in the challenge and the information associated with the new block to be added, and the process is terminated. In a case where the hash value of the entire data included in the block (or a part of the data included in the block) does not satisfy the condition for the success of the challenge (i.e., in a case where the challenge has failed) (No in step S1008), the process returns to step S1004, and the processing unit 221 changes the value of "FileData" to execute the challenge again.

5. Variation

The foregoing has described the operation of the deposit destination node 200 according to the present embodiment. Next, a variation of the present disclosure will be described.

In the embodiment described above, it has been described that a timing (or frequency, etc.) at which the deposit destination node 200 performs a challenge for updating the blockchain data is optional. Meanwhile, the variation of the present disclosure is an example in which a period during which the deposit destination node 200 does not perform a challenge is provided, or the number of challenges (or frequency, etc.) is reduced.

For example, in a case where the deposit destination node 200 determines that reliability of the target data 10 can be secured to a certain level by the challenge being performed for a plurality of times, a period during which the challenge is not performed may be provided or the number of challenges (or frequency, etc.) may be reduced thereafter.

For example, in a case where a predetermined amount or more of data in the target data 10 has been used in a past challenge, the deposit destination node 200 may determine that the reliability of the target data 10 can be secured to a certain level, and a period during which the challenge is not performed may be provided or the number of challenges (or frequency, etc.) may be reduced thereafter. Note that the above is merely an example and can be changed as appropriate. For example, in a case where the challenge has been performed a predetermined number of times, or in a case where the number of challenges is set on the basis of a size of the target data 10 or the like and the challenge has been performed the set number of times, each deposit destination node 200 may set a period during which the challenge is not performed or may reduce the number of challenges (or frequency, etc.) thereafter.

As a result, according to the present variation, it becomes possible to prevent resources of each deposit destination node 200 from being consumed by the challenge being continued without limitation after the reliability is secured to a certain level or more, and to reduce the total amount of reward paid as a consideration for a success of the challenge.

Note that the deposit source node 100 may request each deposit destination node 200 to perform verification (challenge) every predetermined period (e.g., every year), thereby confirming that the target data 10 has been retained in the deposit destination node 200 properly. Furthermore, the deposit source node 100 may request the deposit destination node 200 to perform verification (challenge) before collecting the target data 10 from the deposit destination node 200, thereby confirming that the target data 10 has been retained in the deposit destination node 200 properly. Note that the deposit source node 100 may notify each deposit destination node 200 of the scheduled date and time for requesting the next challenge, thereby motivating each deposit destination node 200 to keep retaining the target data 10.

6. Hardware Configuration of Each Device

The foregoing has described the variation of the present disclosure. Next, a hardware configuration of each device according to the present embodiment will be described with reference to FIG. 8.

Figure 8:
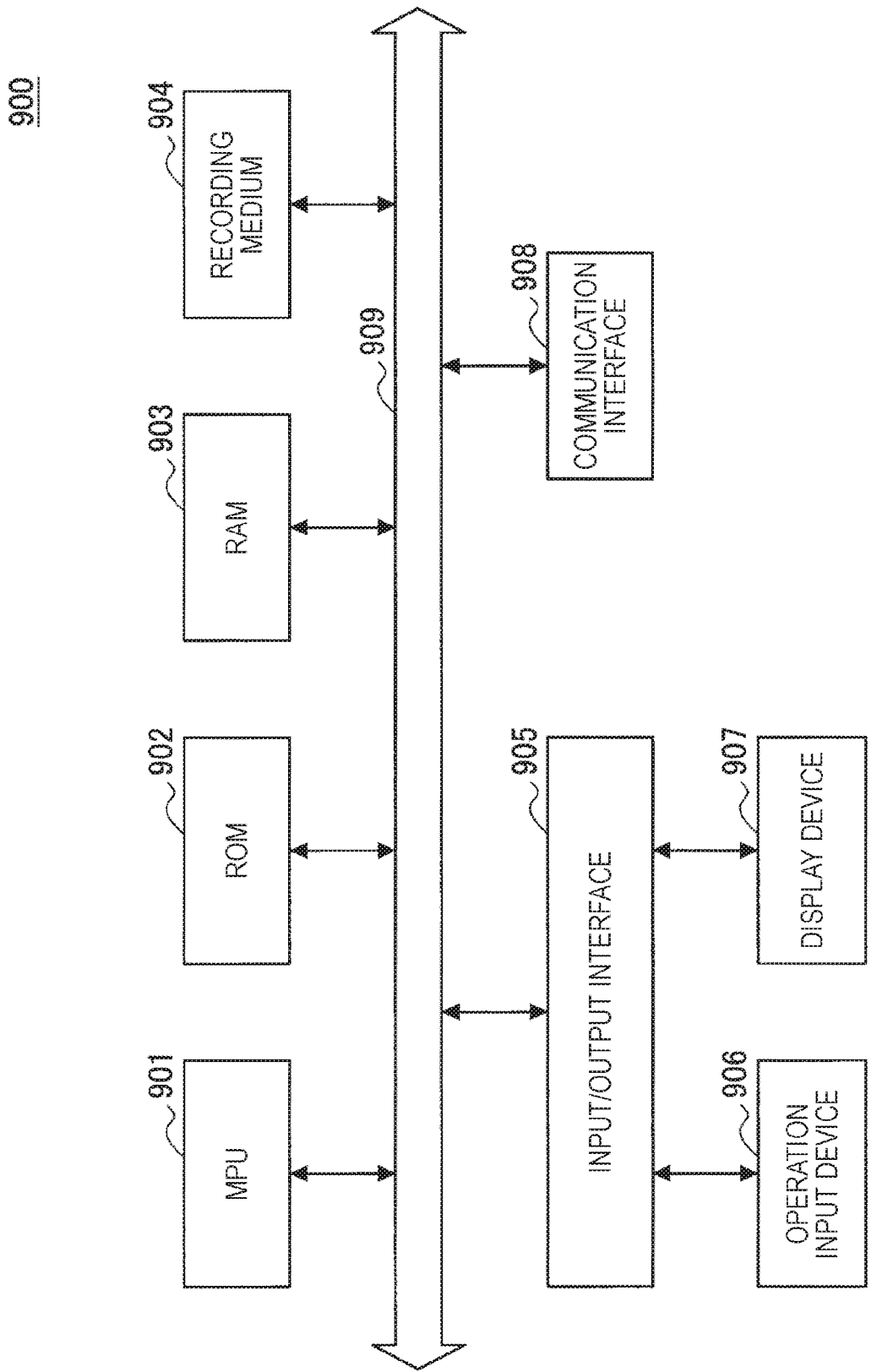
FIG. 8 is a block diagram illustrating an exemplary hardware configuration of the deposit source node or the deposit destination node according to the present embodiment.

FIG. 8 is a block diagram illustrating an exemplary hardware configuration of the deposit source node 100 or the deposit destination node 200 according to the present embodiment. The deposit source node 100 or the deposit destination node 200 according to the present embodiment can be embodied by an information processing apparatus 900 illustrated in FIG. 8.

Then, the information processing apparatus 900 includes, for example, an MPU 901, a ROM 902, a RAM 903, a recording medium 904, an input/output interface 905, an operation input device 906, a display device 907, and a communication interface 908. Furthermore, the information processing apparatus 900 connects the respective components by, for example, a bus 909 serving as a data transmission path.

The MPU 901 includes, for example, one or more processors including an arithmetic circuit such as an MPU, various processing circuits, and the like, and functions as the control unit 120 or the control unit 220 that controls the entire information processing apparatus 900. Note that the control unit 120 or the control unit 220 may be constituted by a dedicated (or general-purpose) circuit (e.g., processor separate from the MPU 901, etc.) capable of implementing the processes of the control unit 120 or the control unit 220.

The ROM 902 stores programs to be used by the MPU 901, control data such as operation parameters, and the like. The RAM 903 temporarily stores, for example, programs to be executed by the MPU 901.

The recording medium 904 functions as the storage 150 or the storage 250, and stores, for example, data related to information processing according to the present embodiment, such as blockchain data and the target data 10, and various kinds of data, such as various applications. Here, examples of the recording medium 904 include a magnetic recording medium such as a hard disk, and a non-volatile memory such as a flash memory. Furthermore, the recording medium 904 may be detachable from the information processing apparatus 900.

The input/output interface 905 connects, for example, the operation input device 906 and the display device 907. The operation input device 906 functions as the input unit 110 or the input unit 210, and the display device 907 functions as the output unit 140 or the output unit 240. Here, examples of the input/output interface 905 include a universal serial bus (USB) terminal, a digital visual interface (DVI) terminal, a high-definition multimedia interface (HDMI) (registered trademark) terminal, and various processing circuits.

Furthermore, the operation input device 906 is provided on the information processing apparatus 900, for example, and is connected to the input/output interface 905 inside the information processing apparatus 900. Examples of the operation input device 906 include a keyboard, mouse, keypad, touch panel, microphone, operation button, direction key, rotary selector such as jog dial, and combinations thereof.

Furthermore, the display device 907 is provided on the information processing apparatus 900, for example, and is connected to the input/output interface 905 inside the information processing apparatus 900. Examples of the display device 907 include a liquid crystal display, and an organic electro-luminescence (EL) display.

Note that it goes without saying that the input/output interface 905 can be connected to an external device, such as an operation input device outside the information processing apparatus 900 and an external display device. Furthermore, the display device 907 may be a device capable of display and user operation, such as a touch panel.

The communication interface 908 is a communication means included in the information processing apparatus 900, and functions as the communication unit 130 or the communication unit 230 for communicating with an external device included in the P2P network 300 according to the present embodiment or an external device to be connected to the P2P network 300 by wire or wirelessly. Furthermore, the communication interface 908 may have a function of, for example, communicating with any external device, such as a server, by wire or wirelessly via any network (or directly). Here, examples of the communication interface 908 include a communication antenna and a radio frequency (RF) circuit (wireless communication), an IEEE 802.15.1 port and a transmission/reception circuit (wireless communication), an IEEE 802.11 port and a transmission/reception circuit (wireless communication), and a local area network (LAN) terminal and a transmission/reception circuit (wired communication).

The information processing apparatus 900 performs a process related to the information processing according to the present embodiment with, for example, the configuration illustrated in FIG. 8. Note that the hardware configuration of the information processing apparatus 900 according to the present embodiment is not limited to the configuration illustrated in FIG. 13.

For example, in a case where the information processing apparatus 900 communicates with the P2P network 300, an external device, or the like via an external communication device connected thereto, the information processing apparatus 900 may not include the communication interface 908. Furthermore, the communication interface 908 may be configured to be capable of communicating with one or more external devices using a plurality of communication schemes.

Furthermore, the information processing apparatus 900 may not include, for example, the recording medium 904, the operation input device 906, the display device 907, or the like.

Furthermore, a part of or all of the configuration (or the configuration according to the variation) illustrated in FIG. 8 may be implemented by one or more integrated circuits (ICs), for example.

7. Conclusion

As described above, the data management system according to the present disclosure can verify the target data 10 more properly by updating blockchain data using the first data obtained from the target data 10 instead of the "nonce". Furthermore, the data management system according to the present embodiment can verify the target data 10 by using the process of calculating the hash value in the challenge, whereby the resources of the deposit destination nodes 200 can be effectively utilized.

Furthermore, the depositor according to the present embodiment can pay a fair consideration for storage or verification of the target data 10 to the custodian (in other words, the custodian can receive, from the depositor, a fair consideration for the storage or the verification of the target data 10 at a certain probability).

Furthermore, the depositor according to the present embodiment can confirm a status of the storage or the verification of the target data 10. In addition, the depositor according to the present embodiment can change the budget on the basis of the status of the storage or the verification of the target data 10 at any time.

Moreover, the variation of the present disclosure can provide a period during which no challenge is performed or reduce the number of challenges (or frequency, etc.). As a result, according to the present variation of the present disclosure, it becomes possible to prevent resources of each deposit destination node 200 from being consumed by the challenge being continued without limitation after the reliability is secured to a certain level or more, and to reduce the total amount of reward paid as a consideration for a success of the challenge.

As described above, although the preferred embodiment of the present disclosure has been described in detail with reference to the accompanying drawings, the technical scope of the present disclosure is not limited to such examples. It is obvious that those skilled in the art in the technical field of the present disclosure may find various alterations and modifications within the scope of the appended claims, and it should be understood that such alterations and modifications are also naturally within the technical scope of the present disclosure.

For example, a part of the configuration of the deposit source node 100 may be provided outside the deposit source node 100 as appropriate. Furthermore, a part of the configuration of the deposit destination node 200 may be provided outside the deposit destination node 200 as appropriate.

Furthermore, a part of the function of the deposit source node 100 may be implemented by the control unit 120. For example, the control unit 120 may implement a part of the functions of the input unit 110, the communication unit 130, or the output unit 140. Furthermore, a part of the function of the deposit destination node 200 may be implemented by the control unit 220. For example, the control unit 220 may implement a part of the functions of the input unit 210, the communication unit 230, or the output unit 240.

Furthermore, the effects described in the present specification are merely illustrative or exemplary, and are not limited. That is, the techniques according to the present disclosure can exert other effects obvious to those skilled in the art from the disclosure of the present specification together with or instead of the effects described above.

Note that the following configurations are also within the technical scope of the present disclosure.

(1)
An information processing apparatus including:
a verification unit that verifies predetermined data using first data obtained from the predetermined data and second data obtained from a P2P database.

(2)
The information processing apparatus according to (1) described above, in which
the verification unit performs predetermined data processing using the first data and the second data, and searches for the first data in which a result of the data processing satisfies a predetermined condition.

(3)
The information processing apparatus according to (2) described above, in which
the verification unit searches for the first data within a range specified for the predetermined data.

(4)
The information processing apparatus according to (3) described above, in which
the range is obtained from the P2P database.

(5)
The information processing apparatus according to (3) described above, further including:
a specification unit that specifies the range.

(6)
The information processing apparatus according to any one of (2) to (5) described above, in which
in a case where the result of the data processing satisfies the condition, the verification unit updates the P2P database using the first data and the second data.

(7)
The information processing apparatus according to (6) described above, in which
the verification unit verifies that the result of the data processing performed by another information processing apparatus satisfies the condition.

(8)
The information processing apparatus according to any one of (1) to (7) described above, in which
the first data is represented by information regarding a starting point and information regarding a data length in the predetermined data.

(9)
The information processing apparatus according to any one of (1) to (8) described above, in which
the P2P database is a blockchain.

(10)
The information processing apparatus according to (2) described above, in which
the data processing is processing for calculating a hash value.

(11)
A method for processing information, the method including:
verifying predetermined data using first data obtained from the predetermined data and second data obtained from a P2P database.

(12)
An information processing apparatus including:
a verification request unit that requests a P2P network to verify predetermined data; and
a confirmation unit that confirms a verification status of the predetermined data on the basis of information obtained from the P2P network.

(13)
The information processing apparatus according to (12) described above, in which
the verification request unit further provides the P2P network with a verification condition for the predetermined data.

(14)
A method for processing information, the method including:
requesting a P2P network to verify predetermined data; and
confirming a verification status of the predetermined data on the basis of information obtained from the P2P network.

REFERENCE SIGNS LIST

100 Deposit source node
200 Deposit destination node
110, 210 Input unit
120, 220 Control unit
121, 221 Processing unit
130, 230 Communication unit
140, 240 Output unit
150, 250 Storage

The invention claimed is:
1. An information processing apparatus, comprising:
circuitry configured to:
request a peer-to-peer (P2P) network to verify specific data, wherein
the verification of the specific data is based on first data obtained from the specific data and second data obtained from a P2P database,
the first data is represented by first information regarding a starting point and second information regarding a data length in the specific data,
the starting point corresponds to a number of bytes that starts from a beginning of a range specified for the specific data, and
the data length starts from the starting point; and
confirm a verification status of the specific data based on third information obtained from the P2P network.

2. The information processing apparatus according to claim 1, wherein the circuitry is further configured to provide the P2P network with a verification condition for the specific data.

3. The information processing apparatus according to claim 1, wherein the range is obtained from the P2P database.

4. The information processing apparatus according to claim 1, wherein the P2P database is a blockchain.

5. A method, comprising:
- requesting a peer-to-peer (P2P) network to verify specific data, wherein
  - the verification of the specific data is based on first data obtained from the specific data and second data obtained from a P2P database,
  - the first data is represented by first information regarding a starting point and second information regarding a data length in the specific data,
  - the starting point corresponds to a number of bytes that starts from a beginning of a range specified for the specific data, and
  - the data length starts from the starting point; and
- confirming a verification status of the specific data based on third information obtained from the P2P network.

* * * * *